(12) United States Patent
Islam et al.

(10) Patent No.: US 10,187,183 B2
(45) Date of Patent: Jan. 22, 2019

(54) SYSTEM AND METHOD FOR RETRANSMISSION OF GRANT-FREE TRAFFIC

(71) Applicants: Toufiqul Islam, Ottawa (CA); Kelvin Kar Kin Au, Kanata (CA); Mohammadhadi Baligh, Ottawa (CA)

(72) Inventors: Toufiqul Islam, Ottawa (CA); Kelvin Kar Kin Au, Kanata (CA); Mohammadhadi Baligh, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 279 days.

(21) Appl. No.: 15/223,690

(22) Filed: Jul. 29, 2016

(65) Prior Publication Data

US 2018/0035458 A1    Feb. 1, 2018

(51) Int. Cl.
| | | |
|---|---|---|
| *H04W 74/04* | (2009.01) | |
| *H04L 1/16* | (2006.01) | |
| *H04L 5/00* | (2006.01) | |
| *H04W 72/12* | (2009.01) | |
| *H04W 74/08* | (2009.01) | |

(52) U.S. Cl.
CPC .............. *H04L 1/16* (2013.01); *H04L 5/0058* (2013.01); *H04L 5/0096* (2013.01); *H04W 72/1289* (2013.01); *H04W 74/0808* (2013.01)

(58) Field of Classification Search
CPC ............. H04W 72/082; H04W 72/042; H04W 72/0413; H04W 72/1268; H04W 72/1289; H04W 74/04; H04L 5/0053
See application file for complete search history.

(56) References Cited

U.S. PATENT DOCUMENTS

| | | | |
|---|---|---|---|
| 2014/0308954 | A1 | 10/2014 | Wang et al. |
| 2016/0219627 | A1 | 7/2016 | Au |
| 2017/0318598 | A1 | 11/2017 | Islam et al. |

FOREIGN PATENT DOCUMENTS

| | | |
|---|---|---|
| CN | 103748907 A | 4/2014 |
| CN | 104683080 A | 6/2015 |
| CN | 104994513 A | 10/2015 |

OTHER PUBLICATIONS

3GPP TSG-RAN WG1 Meeting #84bis R1-162922,"Discussion on multiple access for New Radio systems",InterDigital Communications, Apr. 11-15, 2016,total 4 pages.
3GPP TSG RAN WG1 #85 R1-163993,"Non-Orthogonal Multiple Access Considerations for NR",Samsung,May 23-27, 2016,total 4 pages.
Qualcomm Incorporated, "Numerology and TTI multiplexing for NR Forward Compatibility Analysis" 3GPP TSG-RAN WG1 #85, R1-164692, May 23-27, 2016, pp. 1-8, Nanjing, China.
Qualcomm Incorporated, "Frame structure requirements", 3GPP TSG-RAN WG1 #85, R1-164694, May 23-27, 2016, pp. 1-5, Nanjing, China.
Nokia, Alcatel-Lucent Shanghai Bell, "Punctured Scheduling for Low Latency Transmissions", 3GPP TSG-RAN WG1 #85, R1-165381, May 23-27, 2016, pp. 1-4, Nanjing, P.R. China.

*Primary Examiner* — Jamal Javaid

(57) ABSTRACT

Feedback from a base station is used to reduce retransmissions of a grant-free UE where the SINR of an initial transmission from the grant-free UE is higher than a threshold. Feedback from a base station is also used to adjust transmission by grant-based UEs in resources that overlap with those also available to grant-free UEs.

16 Claims, 12 Drawing Sheets

SYSTEM AND METHOD FOR RETRANSMISSION OF GRANT-FREE TRAFFIC

FIELD

The present application relates to a system and method for coexistence of grant-free uplink traffic with grant-based uplink traffic, and also relates to a system and method for grant-free transmission.

BACKGROUND

In many wireless networks, such as long-term evolution (LTE) networks, the selection of shared data channels for uplink transmission is scheduling/grant-based, and the scheduling and grant mechanisms are controlled by a base station (BS) in the network. A user equipment (UE) sends an uplink scheduling request to the BS. When the BS receives the scheduling request, the BS sends an uplink grant to the UE indicating its dedicated uplink resource allocation. The UE then transmits data on the granted resource. This is a specific example of grant-based uplink traffic. eMBB (enhanced mobile broadband) traffic is a specific example of grant-based traffic.

In contrast, for grant-free traffic, independent of any scheduling request, a UE may be mapped to resources for grant-free transmission. The resources are not dedicated to a UE, and there can be multiple UEs mapped to the same resource. In grant-free transmission, a UE does not rely on a dynamic scheduling request and grant mechanism to transmit data. A given UE that has no data to transmit will not transmit using the mapped resources.

Some grant-free traffic requires high reliability (for example error rates on the order of $\sim 1 \times 10^{-5}$) and low latency (for example, 0.5 ms each way). URLL (ultra-reliable low latency) traffic may employ grant-free communication.

Grant-free traffic typically contains short packets and is mostly sporadic in nature. Dedicated resource assignment to grant-free UEs can render a system very inefficient, since unused radio resources results in lost capacity (assuming pending grant-based traffic). Improved ways to efficiently use those resources are desired.

SUMMARY

Systems and methods are provided that employ feedback from a base station to reduce retransmissions of a grant-free UE where the signal to interference noise ratio (SINR) of an initial transmission from the grant-free UE is higher than a threshold. Systems and methods are provided that employ feedback from a base station to adjust transmission by grant-based UEs using resources that overlap with those also available to grant-free UEs.

A broad aspect of the invention provides a method in which during a grant-free transmit time interval (TTI), a base station performs grant-free activity detection. The base station transmits a notification to adjust grant-based transmission based on a result of the grant-free activity detection.

In some embodiments, the notification is transmitted when activity is detected.

In some embodiments, the notification indicates that a grant-based UE configured to make a scheduled transmission using resources that include an area of overlap with resources for grant-free UEs is not to transmit in the area of overlap. Alternatively, the grant-free UEs can reduce their power in the area of overlap, or some other interference mitigation technique can be employed.

In some embodiments, performing activity detection involves detecting activity by grant-free UEs with enough remaining retransmissions in the area of overlap with resources for grant-based transmission for feedback to be useful.

In some embodiments, the method further involves estimating an associated SINR of a detected activity. The base station transmits the notification to adjust grant-based transmission when activity is detected and the associated SINR is less than a threshold.

In some embodiments, the notification is an indication of whether or not to adjust grant-based transmission for each resource area of a plurality of resource areas within a grant-free frequency partition.

In some embodiments the notification is transmitted using a dedicated downlink feedback channel. Alternatively, downlink transmissions are punctured to send the notification.

Another broad aspect of the invention provides a method in which during a grant-free TTI, a base station performs grant-free activity detection. The base station estimates an associated SINR of a detected activity. The base station transmits a notification to reduce grant-free retransmission based on a result of the grant-free activity detection when activity is detected and the associated SINR is greater than a threshold.

In some embodiments, as part of performing grant-free activity detection, the base station determines whether a detected grant-free transmission is an initial transmission or a retransmission. The base station transmits the notification to reduce grant-free retransmission when it is determined that the detected grant-free transmission is an initial transmission or a retransmission in respect of which at least one further retransmission is expected.

In some embodiments, performing grant-free activity detection involves performing grant-free activity detection in respect of uplink resources dedicated to initial grant-free transmissions, or in respect of uplink resources dedicated to retransmissions in respect of which at least one further retransmission is expected.

Another broad aspect provides a method in which a grant-free UE transmits an initial grant-free transmission containing pilot symbols, the grant-free transmission having a non-zero number of associated retransmissions. The grant-free UE monitors downlink feedback based on activity detection and SINR for the initial grant-free transmission. The grant-free UE transmits fewer than the non-zero number of retransmissions based on the feedback.

In some embodiments, transmitting the initial transmission comprises using a resource area that is reserved for initial transmissions, and transmitting retransmissions comprises using at least one resource area reserved for retransmissions.

In some embodiments, transmitting retransmissions in at least one resource area reserved for retransmissions comprises transmitting all retransmissions using at least one resource area reserved for any retransmissions.

In some embodiments, transmitting retransmissions in at least one resource area reserved for retransmissions comprises transmitting an ith retransmission, in a respective resource area reserved for ith retransmissions, where i= 1, . . . , N, where N is the non-zero number of associated retransmissions.

Another broad aspect provides a method in which a grant-based UE receives scheduling information to make a scheduled transmission using an uplink time-frequency resource that includes an area of possible overlap between grant-based transmission and grant-free transmission. The grant-based UE monitors feedback for a notification to adjust grant-based transmission in the area of possible overlap. The grant-based UE makes the scheduled transmission using the uplink time frequency resource not including the area of possible overlap.

Further embodiments provide a base station or a UE configured to implement one or a combination of the above summarized methods.

Another broad aspect provides a base station having an activity detector configured to perform grant-free activity detection during a grant-free transmit time interval (TTI), a feedback generator configured to generate a notification to adjust grant-based transmission based on a result of the grant-free activity detection; and a transmitter for transmitting base station signals comprising the notification.

Another broad aspect provides a base station having an activity detector configured to perform grant-free activity detection during a grant-free TTI and to estimate an associated SINR of a detected activity, a feedback generator configured to generate a notification to reduce grant-free retransmission based on a result of the grant-free activity detection when activity is detected and the associated SINR is greater than a threshold, and a transmitter for transmitting base station signals comprising the notification.

Another broad aspect provides a user equipment (UE) having a transmitter configured to transmit an initial grant-free transmission containing pilot symbols, the grant-free transmission having a non-zero number of associated retransmissions, and a receiver for monitoring downlink feedback based on activity detection and SINR for the initial grant-free transmission. The transmitter transmits fewer than the non-zero number of retransmissions based on the feedback.

Another broad aspect provides a user equipment (UE) having a receiver configured to receive scheduling information to make a scheduled transmission using an uplink time-frequency resource that includes an area of possible overlap between grant-based transmission and grant-free transmission, and to monitor feedback for a notification to adjust grant-based transmission in the area of possible overlap. The UE has a transmitter configured to make the scheduled transmission using the uplink time frequency resource not including the area of possible overlap.

BRIEF DESCRIPTION OF THE DRAWINGS

Embodiments of the disclosure will now be described with reference to the attached drawings in which.

DETAILED DESCRIPTION

Figure 1:
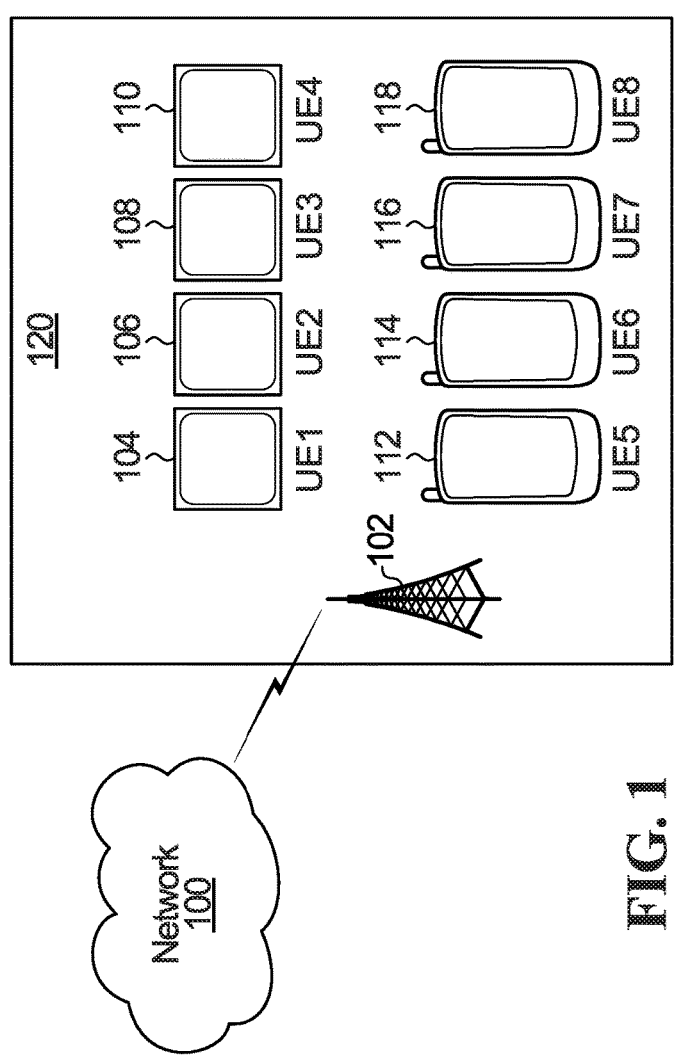
FIG. 1 is a block diagram of a network configured to implement network assisted coexistence of grant-free and grant-based traffic.

Generally, embodiments of the present disclosure provide a method and system for grant-based traffic to coexist with grant-free traffic for uplink transmissions. In addition, embodiments for grant-free retransmission based on feedback are provided. For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

For the purpose of this description, a grant-free user equipment (UE) is a UE that is configured to transmit grant-free traffic. The UE may also have other capabilities including transmission of grant-based traffic. Grant-free transmission means that a UE does not rely on a dynamic scheduling request and grant mechanism to transmit data. The transmission resources and formats (e.g. modulation and coding schemes) may be pre-configured or semi-statically configured. A grant-based UE is a UE that is configured through scheduling to transmit grant-based traffic, but such a UE may also have other capabilities including transmission of grant-free traffic.

Referring to FIG. 1, a schematic diagram of a network 100 is shown. A base station (BS) 102 provides uplink and downlink communication with the network 100 for a plurality of UEs 104-118 within a coverage area 120 of the BS 102. In a specific example, UEs 104-110 are grant-free UEs, and UEs 112-118 are grant-based UEs. In a more specific example, the UEs 104-110 employ Orthogonal Frequency Division Multiple Access (OFDMA) or other non-orthogonal access schemes such as sparse code multiple access (SCMA) to transmit URLL traffic. UEs 112-118 may, for example, transmit eMBB traffic. UEs 112-118 may use grant-based OFDMA or other non-orthogonal access schemes such as SCMA. The BS 102 may, for example, be an access point. FIG. 1 shows one BS 102 and eight UEs 104-118 for illustrative purposes, however there may be more than one BS 102 and the coverage area 120 of the BS 102 may include more or fewer than eight UEs 104-118 in communication with the BS 102.

This invention concerns uplink transmissions. Grant-free activity detection is exploited for adjusting future transmission, either of grant-free UEs 104-110, or grant-based UEs 112-118 that can transmit using resources that overlap with those that might be used by grant-free UEs.

The grant-free UEs 104-110 typically transmit with a TTI (transmission time interval) duration that is shorter than a TTI duration for grant-based UEs 112-118 for lower latency. Two specific examples of grant-free TTIs are TTIs with 60 kHz subcarrier spacing with 7 symbols or 15 kHz subcarrier spacing with 3 or 4 symbols. The subcarrier spacing is implementation specific. In another example, grant-free TTIs employ a 30 kHz subcarrier spacing.

In the present disclosure, from a grant-based UE perspective, a "transmission time interval" (TTI) or "scheduling interval" corresponds to the interval between the beginning of the time scheduled by an instance of scheduling control signaling, and the beginning of the time scheduled by the next instance of scheduling control signaling. The duration of a scheduling interval can be measured or specified in units of time (e.g., 1 ms) or in symbols (e.g., 14 OFDM symbols). The duration of a scheduling interval can be fixed or configurable, and may vary depending on other wireless communication parameters such as subcarrier spacing. From a grant-free UE perspective, a TTI refers to a time interval within which a given grant-free UE can be mapped for transmission if it has data to send. A TTI is also the time interval over which a grant-free UE transmits a transport block.

A given grant-free UE is mapped to one or more grant-free regions of a time-frequency resource within a system bandwidth. The grant-free UE transmits a packet using the mapped resources if it has data to send. Grant-free activity detection is performed by the base station 102 at the beginning of the TTI, for example based on pilot symbols that are included near the beginning of the grant-free TTI as detailed below. If grant-free activity is detected, the base station 102 then processes this and sends a notification of grant-free activity in the downlink in the next TTI. This notification will also be referred to as feedback herein.

In some embodiments, the feedback is for the grant-free UE that made the grant-free transmission. In this case, the notification is a notification to reduce grant-free retransmission, the function of which is detailed below.

In some embodiments, the notification is to adjust grant-based transmission for grant-based UEs, the function of which is detailed below.

In some embodiments, a notification or notifications for both purposes is sent.

Activity detection based on pilot symbols which are placed at the beginning of the TTI can be performed relatively quickly compared to decoding the full transport block after the end of the TTI which would require waiting for the full transport block to be received. However, the methods described herein may also be performed based on pilot symbols that are not necessarily near the beginning of the TTI. For example, if the TTI is long enough to allow sufficient time for feedback processing, the method may be performed based on pilots that are not at the beginning of the TTI. For example, a particular grant-free UE may be configured to employ a 60 kHz subcarrier spacing and 14 symbols, and a grant-free TTI of 0.25 ms. In such a case, a pilot symbol may be transmitted at the beginning of the TTI, and another piot symbol may be transmitted later in the TTI. The base station may have time to process and utilize both for the purpose of generating the feedback. However, the feedback is not equivalent to an ACK/NACK as it is not a function of whether a transmission was correctly decoded or not.

In any event, activity detection is performed in a manner that allows sufficient time for the feedback in the next TTI and for adjusting future transmissions accordingly. In some embodiments, the pilot symbols are pilot sequences that may be uniquely assigned to UEs, in which case successful pilot symbol detection can identify the number of active UEs, and can identify which specific UEs are active. Alternatively, one or more of the pilot symbols are pilot sequences that may be assigned to more than one UE, in which case the activity detection cannot identify the number of active UEs, or specific UEs. However, the number of unique pilot sequences that are successfully detected as active functions as a lower bound on the number of active UEs.

In some embodiments, activity detection is based on one or combination of metrics that depend on, for example grant-free UE load, received power, number of active UEs. In some embodiments, activity detection is performed to identify an overlap between grant-based and grant-free traffic. If the number of grant-free UEs transmitting exceeds a threshold value, then a notification is sent to grant-based UEs to adjust their transmission in an area of overlap for retransmissions. This is a simple form of activity detection. In some embodiments, the notification is a multi-level notification that depends on how metrics for detection are accounted for. Using such a multi-level notification, a grant-based UE may be asked to continue to transmit at the assigned power, reduce power to half or any other value, or puncture all or a specified portion of the grant-free resources, or implement some other interference mitigation technique.

The described embodiments herein for the most part focus on the punctured case only. However, more generally, throughout this description, whenever puncturing is referenced herein, alternative embodiments are contemplated in which power is reduced, and/or other collision mitigation measures might be performed instead, for example using the multi-level notification referred to above.

In some embodiments, the reliability requirement for activity detection is greater than the reliability requirement for data. For example, if the mechanism strictly depends on estimating SINR and number of active pilot symbols, then reliability of activity detection can be required to be equal or below $10^{-6}$ if data reliability needed is $10^{-5}$. This is because where the result of activity detection is relied upon to reduce the retransmissions of grant-free traffic, the grant-free transmission could fail to be correctly decoded.

Grant-free UEs are configured to transmit an initial grant-free transmission (also referred to herein as a new transmission) and at least one grant-free retransmission associated with the initial grant-free transmission. There may be a predefined number of retransmissions. For example, a UE can be configured to transmit an initial transmission and one retransmission. In some embodiments, the retransmission is made irrespective of whether or not the initial transmission was successfully received and decoded. This method of retransmission mitigates the latency of waiting for an acknowledgement (ACK) or a negative acknowledgement (NACK) prior to retransmission. This latency may be unacceptable for some grant-free traffic, such as URLL traffic. In some embodiments detailed below, the transmitted notification is used as a form of pseudo acknowledgement by the grant-free UE and the UE can continue, decrease, or stop its retransmissions based on this. In some embodiments, one or more configurations are assignable for a given UE in terms of the number of retransmissions the UE is expected to make for each new transmission. This may be updated, for example by long term adaptation. In some embodiments, a UE is configured to make a random number of retransmissions.

In some embodiments, the co-existence of grant-free traffic with grant-based traffic is controlled through the use of feedback such that for each grant-free UE, the grant-free traffic has at least one transmission that does not collide with grant-based traffic. In some embodiments, co-existence is controlled such that where an initial grant-free transmission is of sufficient quality (for example based on SINR exceeding a threshold), co-existence of both the initial grant-free transmission and retransmissions is permitted, but where the initial grant-free transmission is not of sufficient quality, the grant-based traffic is adjusted such that the grant-free traffic has at least one retransmission that does not collide with grant-based traffic. This is achieved, at least in part, through the use of feedback which informs grant-based UEs of the existence of grant-free traffic. The grant-based UEs use this feedback to modify their transmission. Detailed examples are provided below. In some embodiments, the number of allowable collisions controlled through the use of feedback is a configurable parameter, and this may be set depending upon a number of UEs mapped to a region, the UEs' retransmission policy, and how many regions exist per TTI. In some embodiments, the number of allowable collisions can also be made dependent upon the quality of an initial transmission.

Figure 2:
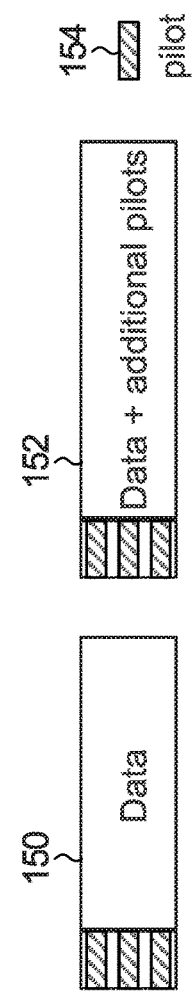
FIG. 2 contains two examples of sub-frame structures featuring pilot symbols at or near the beginning of the sub-frame.

In order to enable the downlink feedback referred to above to be delivered in a timely manner, in some embodiments, grant-free UEs are configured to use a frame structure in which there are pilot symbols that precede the bulk of the data in a given sub-frame. Referring now to FIG. 2A, shown are examples of two very simplified sub-frame structures 150, 152 for grant-free transmission. For these examples, the horizontal direction is time and the vertical direction is frequency. In both examples, there are pilot symbols 154 that are positioned to precede the bulk of the data within the sub-frame. In the first example 150, all pilot symbols 154 are transmitted during a first OFDM symbol. In the second example 152, there are pilot symbols 154 in the first OFDM symbol, and additional pilot symbols elsewhere within the sub-frame. More generally, in some embodiments, the pilot symbols used for activity detection are near the start of the frame structure. The exact location does not need to be the first symbol. In some embodiments, several symbols near the start of the frame structure include pilot symbols. However, as noted previously, some embodiments may rely on pilot symbols located elsewhere than at the start of the sub-frame.

Figure 3A:
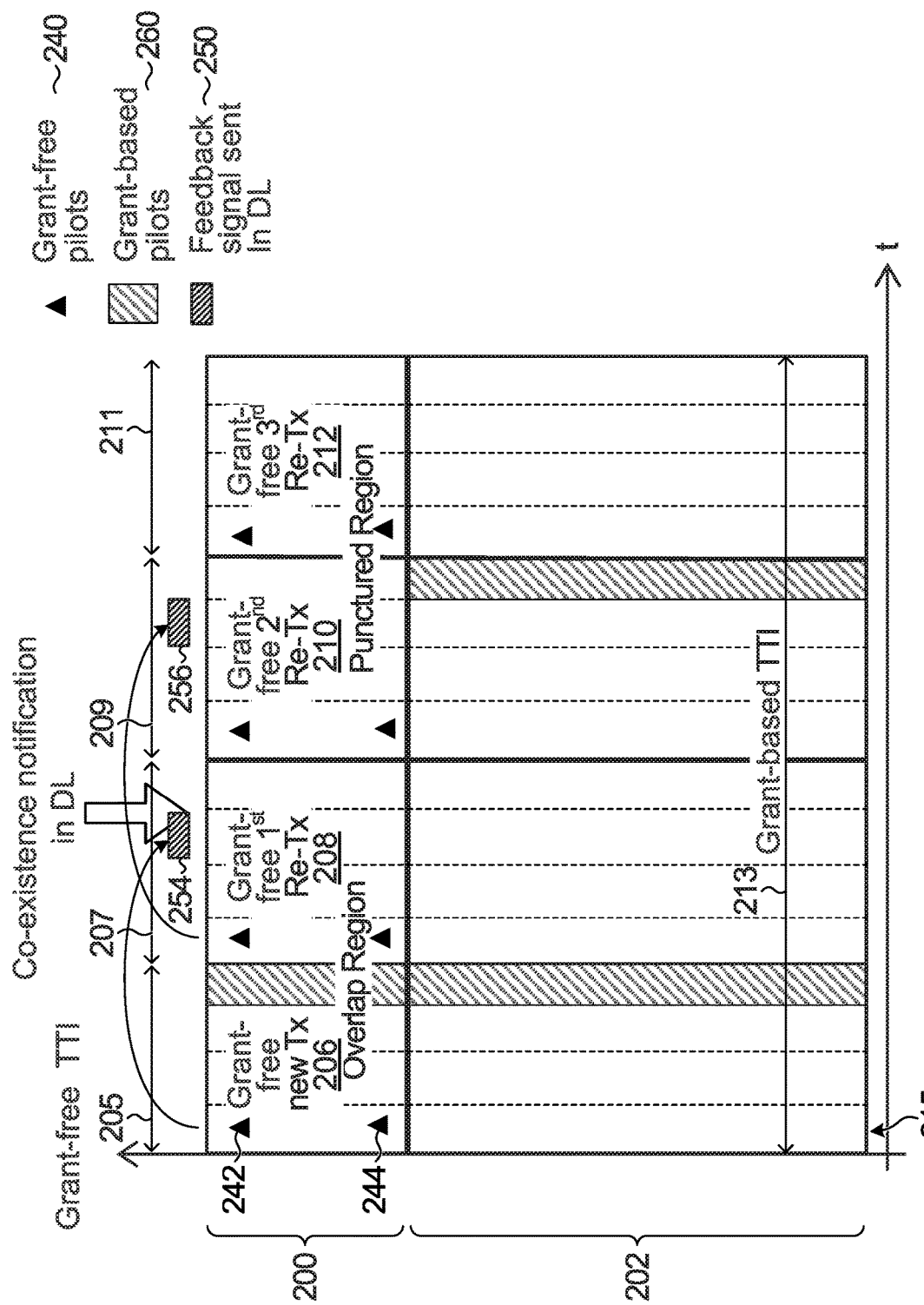
FIGS. 3A to 3C are time-frequency resource allocation diagrams showing examples of network assisted coexistence of grant-free and grant-based traffic.

Referring to FIG. 3A, shown is a first example of a frame structure configured for the co-existence of grant-free and grant-based traffic, for example URLL and eMBB, provided by an embodiment of the invention. The vertical dimension is frequency, and the horizontal axis is time, showing a division into OFDM symbols. The first OFDM symbol is labelled 215. A system bandwidth is divided into two frequency partitions 200, 202. The first partition 200 is available for grant-free traffic and grant-based traffic, with the possibility of overlap, as detailed below. The second partition 202 is only available for grant-based traffic. For grant-based traffic, shown is a single TTI 213 having a duration suitable for grant-based traffic, for example having a 0.5 ms TTI duration. The TTI 213 for grant-based traffic ("grant-based TTI") is sub-divided into four (more generally some two or more) sub-TTIs 205, 207, 209, 211, each of which corresponds to a TTI for grant-free traffic ("grant-free TTI"). Each of the four grant-free TTIs 205, 207, 209, 211 has a duration suitable for grant-free traffic, 0.125 ms in the illustrated example. The shorter TTI duration used in the first frequency partition is suitable for grant-free traffic requiring low latency.

For this embodiment and the other embodiments described herein, the TTI size for grant-free traffic, the TTI size for grant-free traffic, the size of the frequency partitions, the number of grant-free TTIs in a grant-based TTI, the number and location of pilots for grant-free and grant-based traffic, the size and shape of resource areas and regions, can be defined on an implementation specific basis.

As noted above, the first partition 200 is available for use by grant-free traffic. Within the first partition 200 there are four resource areas 206, 208, 210, 212 within which grant-free sub-frames can be transmitted during the four grant-free TTIs 205, 207, 209, 211. Given that grant-free transmission is unscheduled, in general, for a given instance of the frame structure of FIG. 3A, there may or may not be any grant-free transmissions occupying these resources. In the example of FIG. 3A, a new grant-free transmission occurs in resource area 206, and first, second and third grant-free retransmissions occur in grant-free resource areas 208, 210, 212 respectively. Each of the grant-free transmissions includes pilot symbols at the start of the grant-free sub-frames, as discussed previously with reference to FIG. 2A. For example, a grant-free sub-frame transmitted in resource area 206 contains pilot symbols 242, 244 in the first OFDM symbol.

Turning now to grant-based traffic, both partitions 200, 202 are available for grant-based traffic. Partition 202 is available for use free from any overlap with grant-free traffic, whereas grant-based traffic sent in partition 200 is subject to possible overlap with grant-free traffic. When full utilization is employed, the entirety of both partitions 200, 202 is used for grant-based traffic. When partial utilization is employed, the entirety of partition 202 and a sub-set of the resources within partition 200 are used for grant-based traffic. Grant-based UEs receive and process a downlink feedback channel 250 and base their utilization of partition 200 on the received feedback.

The downlink feedback channel 250 is used for transmitting the above-discussed notification of activity detection. In the illustrated example, the downlink feedback channel includes a respective feedback opportunity 254, 256, during each sub-TTI 207, 209. The feedback channel 250 is used to inform grant-based UEs of the existence of grant-free traffic in an area of possible overlap between grant-free and grant-based traffic so that they can adjust grant-based transmission. The downlink feedback channel is incorporated into downlink transmissions to notify grant-based UEs of which resources need to be clear of grant-based traffic in the shared partition 200. As a specific example, a set of downlink symbols are transmitted during a period of possible overlap between grant-free uplink traffic and grant-based uplink traffic, and a few tones in one of the set of downlink symbols, for example the third downlink symbol in the set, is reserved for opportunistic feedback. The location of this feedback control signal may be configurable.

The feedback opportunity 254 can be used to adjust grant-based transmission in resource area 210 during sub-TTI 209, and the feedback opportunity 256 can be used to adjust grant-based transmission in resource area 212 in sub-TTI 211. For the illustrated example, there is no feedback during sub-TTI 205 because it cannot be generated quickly enough following activity detection during the same sub-TTI. However, if it could be generated quickly enough, then feedback could be used to adjust grant-based transmission in sub-TTI 207. There is no feedback during sub-TTI 211 as there are no further retransmissions after that sub-TTI.

In some embodiments, the downlink feedback is a broadcast signal for reception by multiple grant-based UEs. This is appropriate for situations where multiple grant-based UEs may experience an overlap with grant-free transmissions.

In some embodiments, the downlink feedback is unicast to a specific grant-based UE. This can be pre-configured to indicate a particular co-existence scenario. This feedback may be different for different grant-based UEs. For example, the breakdown between grant-based vs. grant-free traffic can be different in different bands for different grant-based UEs.

In some embodiments, the downlink feedback is sent by puncturing downlink data. Alternatively, dedicated resources can be employed for the downlink feedback.

In some embodiments, the feedback is sent on an on demand basis, only when necessary to indicate grant-free transmission in the overlap region. On the receiver side, the feedback signal needs to be monitored on an ongoing basis.

In the illustrated example, there is a grant-free transmission in sub-frame 206. The feedback opportunity 254 in the second sub-TTI 207 is used to notify grant-based UEs of the existence of the grant-free transmission. Based on each grant-free UE being configured to transmit a new transmission and three retransmissions in this example, the notification is equivalently an indication of the existence of retransmissions in resource areas 210, 212. In response, the grant-based UEs do not transmit within resource areas 210, 212. The overall result is that grant-based traffic is present in partition 202 and is also present in resource areas 206, 208 within partition 200. A single grant-based transport block may be transmitted in partitions 200,202, and/or different grant-based transport blocks may be transmitted in each of partitions 200,202. In some embodiments, the entire structure of FIG. 3A can be considered a single grant-based transport block. Resource areas 210, 212 are punctured from the grant-based perspective, meaning that grant-based traffic is not transmitted using those resources. It can be seen that grant-based traffic transmitted in resource areas 206, 208 overlaps with the initial grant-free transmission and first grant-free retransmission, but that as a result of the notification, there is no overlap in resource areas 210, 212. As such, the second and third retransmissions are not subject to interference from the grant-based traffic.

Alternatively, the resources available for grant-based transmission can be viewed as including the resources within partition 202, and any of the resource areas 206, 208, 210, 212 in respect of which feedback indicating an overlap has not been received.

In a specific example, partition 200 includes 10 resource blocks, and partition 202 includes 50 resource blocks. When feedback is received indicating overlap, the 10 resource blocks in partition 200 are not used during a subsequent TTI.

Figure 3B:
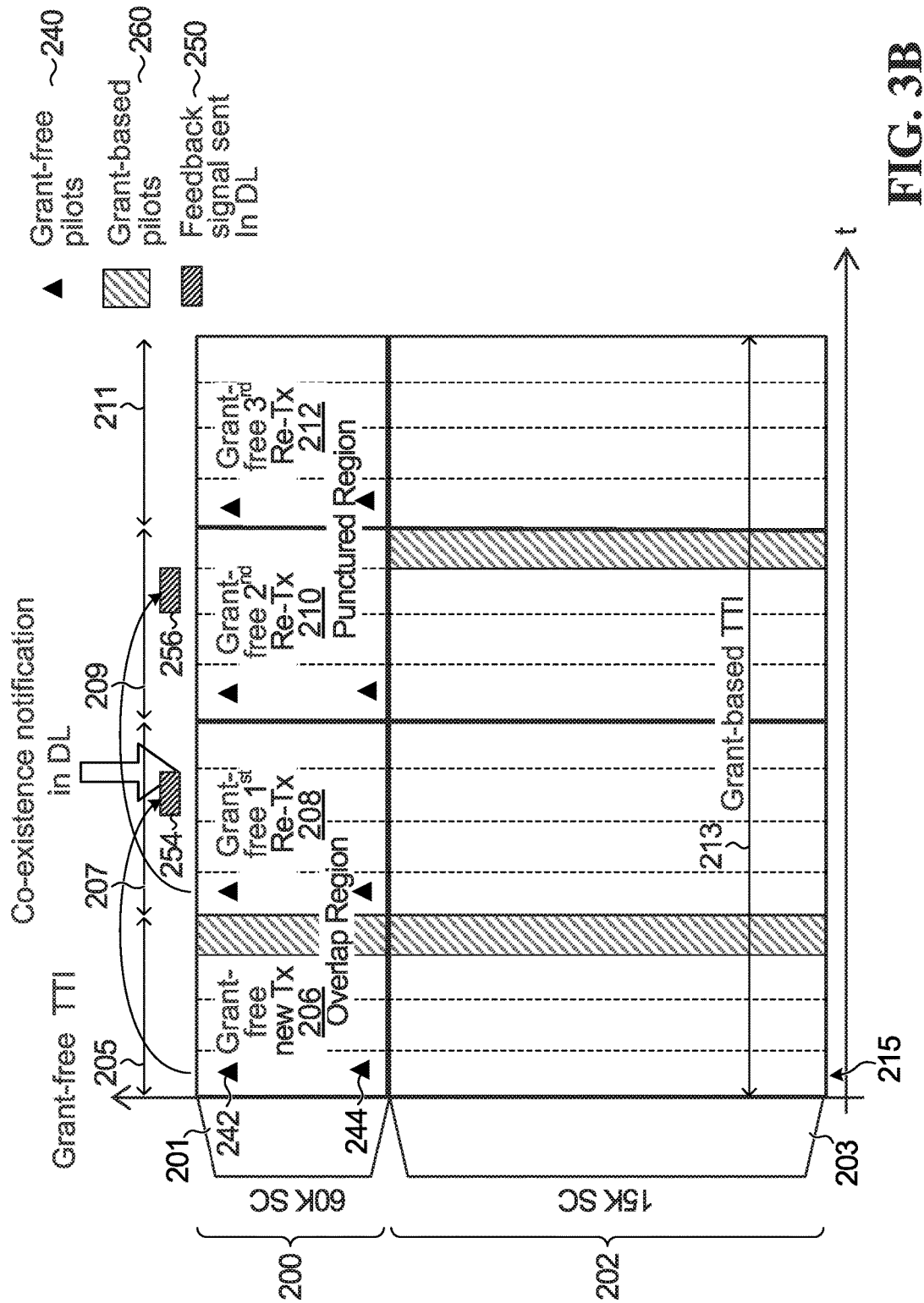

In some embodiments, the two partitions 200, 202 are in respective sub-bands having different sub-carrier spacings. An example of this is depicted in FIG. 3B where the first frequency partition 200 operates within a sub-band 201 with a numerology having a 60 kHz sub-carrier spacing, whereas the second frequency partition 202 operates within a sub-band 203 with a numerology having a 15 kHz sub-carrier spacing. In some embodiments, a grant-based UE transmitting in the 60 kHz band is scheduled separately from a grant-based UE transmitting in the 15 kHz band. In another example, all traffic including grant-based and grant-free traffic uses a 30 kHz sub-carrier spacing. In another example, grant-free traffic uses a 30 kHz sub-carrier spacing and grant-based traffic uses a 15 kHz sub-carrier spacing. In another example, grant-free traffic uses a 60 kHz sub-carrier spacing and grant-free traffic uses a 30 kHz sub-carrier spacing. In another example, both grant-free and grant-based traffic may use a common sub-carrier spacing, such as 60 kHz or 120 kHz, with different TTI durations.

Figure 3C:
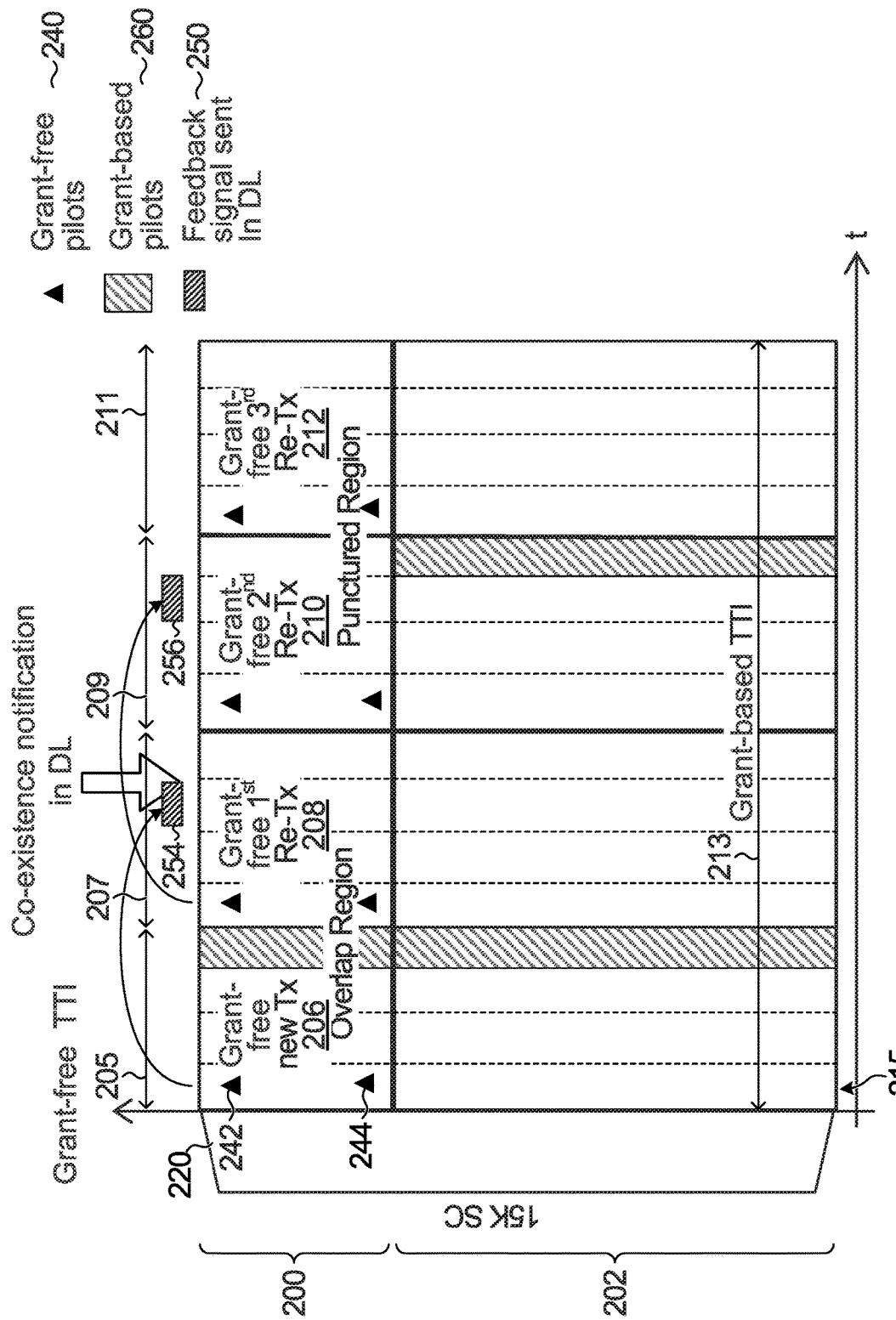

In some embodiments, the partitions 200, 202 are within a single sub-band. An example is depicted in FIG. 3C where two frequency partitions 200, 202 are within a single band 220 with a 15 kHz sub-carrier spacing. Unlike the FIG. 3A example, in the FIG. 3B example, the grant-free partition 200 and grant-based partition 201 employ the same numerology, however their TTI durations can still be different as detailed above. This embodiment is particularly suitable for the case where a transport block for a single UE is scheduled over both partitions 200 and 202.

As detailed above, pilot symbols may be included at an early portion of the grant-free sub-frame structure. If a short TTI is employed, the channel may not change much, and pilot symbols at the beginning of the TTI are sufficient for channel estimation as per the example of FIG. 2A. If the TTI is longer, then additional pilot symbols can be included as per the example of FIG. 2B. Activity detection may be performed based on the pilot symbols at the beginning of the TTI, or may also be based on later pilot symbols as described previously. Effective grant-free SINR for a TTI can be reliably estimated using pilot signals placed at the beginning of the TTI because time fading is minimal within a short TTI In some embodiments, the pilot sequences are sufficient to identify the number and identity of active grant-free UEs. In some embodiments, where the grant-free UE can be uniquely identified, and where specific resources assigned to retransmissions by that grant-free UE can be determined, the feedback instructs the grant-based UE to puncture only the specific resources occupied by the active grant-free UE. Examples are provided below. This approach can be applied to any of the embodiments described herein.

In other embodiments, the pilot sequences are not uniquely assigned to grant-free UEs. In this case, the pilot sequences can still be used to estimate the number of active grant-free UEs, although an exact determination may not be possible. In such embodiments, partition 200 over the entire grant-free TTI can be punctured (e.g. all of region 210,212) (i.e., not used for grant-based traffic) when a number of active grant-free UEs is greater than a threshold, or when a predicted number of retransmissions in a grant-free TTI is greater than a threshold.

In some embodiments, to enhance activity detection reliability, grant-free UEs may use autonomous power boost on pilot symbols so that if they collide with grant-based data, they can still be reliably estimated. Alternatively, grant-free pilot symbols may be exempted from overlap with grant-free traffic.

In some embodiments, grant-based pilot symbols and grant-free pilot symbols are configured such that the grant-free pilot symbols do not overlap with grant-based pilot symbols. Referring again to FIG. 3A, grant-based pilot symbols are indicated at 260, and it can be seen that there is no overlap between the grant-based pilot symbols 260 and the grant-free pilot symbols 240. The number of grant-based pilot symbols 260 in this and other embodiments is implementation specific. A longer grant-based TTI would benefit from more pilot symbols. More generally, grant-free pilot symbols and grant-based pilot symbols can also be mapped to any set of OFDM symbols, and may overlap.

In the described embodiments, grant-based pilot symbols are mapped to specific OFDM symbols. Note that it is not necessarily the case that entire OFDM symbols are mapped to by pilot symbols. The pilot symbols may be multiplexed with data in one or more OFDM symbols. More generally still, for this embodiment and the other embodiments described herein, grant-based pilot symbol location can be arbitrary, can be scattered, can overlap with grant-free pilot symbols or traffic, can be confined to one or more OFDM symbols per scheduling interval etc. In the described embodiments, grant-based pilot symbols are mapped to specific OFDM symbols.

FIG. 3A shows resource areas for initial transmissions and specific grant-free retransmissions. In other embodiments described below, resource areas are for initial transmission and grant-free retransmissions, generally, and in other embodiments resource areas are not dedicated to initial transmissions as opposed to retransmissions. For any of the embodiments described herein, the actual size of these resource areas can be arbitrary. In a specific example, a resource area for new transmissions may be larger than a region for first retransmissions, and a resource area for first retransmissions may be larger than a resource area for second retransmissions.

In some embodiments, grant-based pilot symbols and grant-free pilot symbols are configured such that the grant-free pilot symbols may overlap with grant-based pilot symbols. If overlap is permitted, a covariance matrix of grant-free and grant-based pilot sequence can be further exploited to estimate the SINR of grant-free traffic.

In some embodiments, the timing of new grant-free transmissions is aligned as between all grant-free UEs. Referring to FIG. 3A, a grant-based TTI 213 is aligned with four grant-free TTIs 205, 207, 209, 211. All new grant-free transmissions occur in the first TTI 205. Re-transmissions occur in the subsequent TTIs 207, 209, 211. Such a system simplifies activity detection, because a base station can identify whether a transmission is a new transmission or a retransmission based on the TTI in which it occurs. In addition, the entirety of partitions 200 and 202 can be used for grant-based traffic when there is no grant-free transmission. However, a disadvantage is the increased latency due to the fact that initial transmissions must wait for the start of a longer grant-based TTI.

Figure 3D:
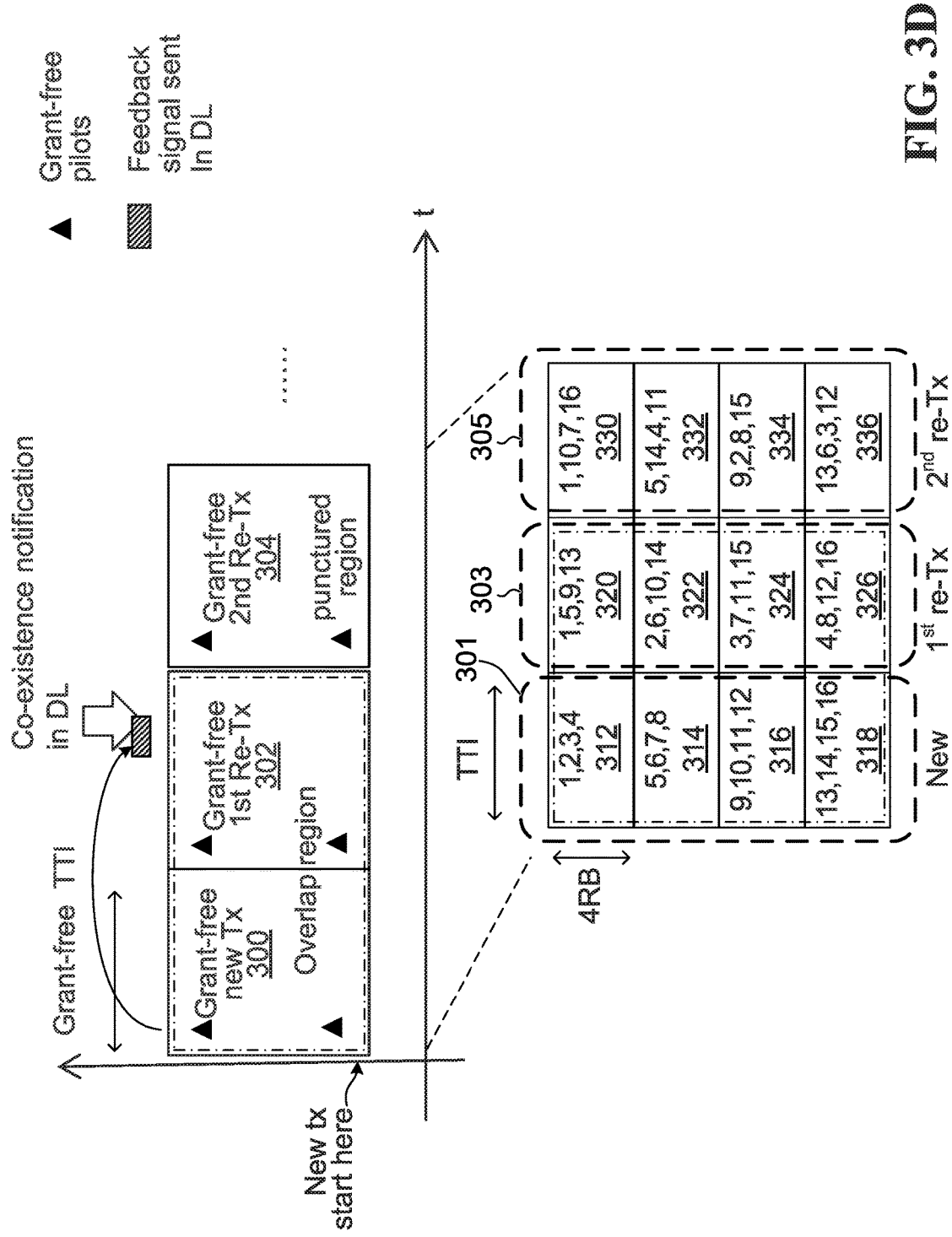
FIG. 3D is an example of UE mapping to resources defined for initial transmissions and retransmissions.

In some embodiments, the resources used by grant-free UEs follow a certain mapping, known to both the UEs and the base station when they transmit new transmissions or retransmissions. An example is shown in FIG. 3D which shows a mapping to resource areas 300, 302, 304 during grant-free TTIs 301, 303, 305 for new transmissions, first retransmissions and second retransmissions. Each resource area has 16 resource blocks. The resource blocks of each resource area are divided into four regions each containing four resource blocks. Four resource blocks is the unit of resource assigned for each UE if it has data to transmit for this example. This allocation may be based on average payload requirement and may be updated. The regions for TTI 301 are indicated at 312, 314, 316, 318. Each region supports up to four grant-free UEs in this example. A list of four numbers depicted for each region represents a set of four UEs mapped to that region. A UE will make grant-free transmissions using the regions to which it is mapped in a given TTI, if it has data to send. However, the UE may or may not have a transmission to make in a given region to which it is mapped. In the illustrated example, for initial transmissions, during TTI 301, UEs 1, 2, 3, 4 are mapped to region 312; UEs 5, 6, 7, 8 are mapped to region 314; UEs 9, 10, 11, 12 are mapped to region 316; and UEs 13, 14, 15, 16 are mapped to region 318. From one TTI to the next, the mapping changes. For first retransmissions, during TTI 303, UEs 1, 5, 9, 13 are mapped to region 320; UEs 2, 6, 10, 14 are mapped to region 322; UEs 3, 7, 11, 15 are mapped to resource area 324; and UEs 4, 8, 12, 16 are mapped to region 326. For second retransmissions, during TTI 305, UEs 1, 10, 7, 18 are mapped to region 330; UEs 5, 14, 4, 11 are mapped to region 332; UEs 9, 2, 8, 15 are mapped to resource area 334; and UEs 13,6,3,12 are mapped to region 336.

In some embodiments, where the base station can determine which UE is detected (for example using the pilot sequence based approach referred to below), based on knowledge of a mapping such as that described with reference to FIG. 3D, the base station knows precisely the resources required by that UE for its second retransmission. In that case, the base station can instruct grant-based UEs to only puncture those resources. For the example of FIG. 3D, if UE 1 is detected in region 312, feedback is sent on the downlink during TTI 303, and grant-free UEs are instructed to puncture uplink transmissions in region 330 which is where UE 1 is expected to make its second retransmission. This mapping approach can be applied to any of the embodiments described herein, including the TDD embodiments described below with reference to FIGS. 6A, 6B and 7, and does not require the specific mapping of FIG. 3D.

Figure 3E:
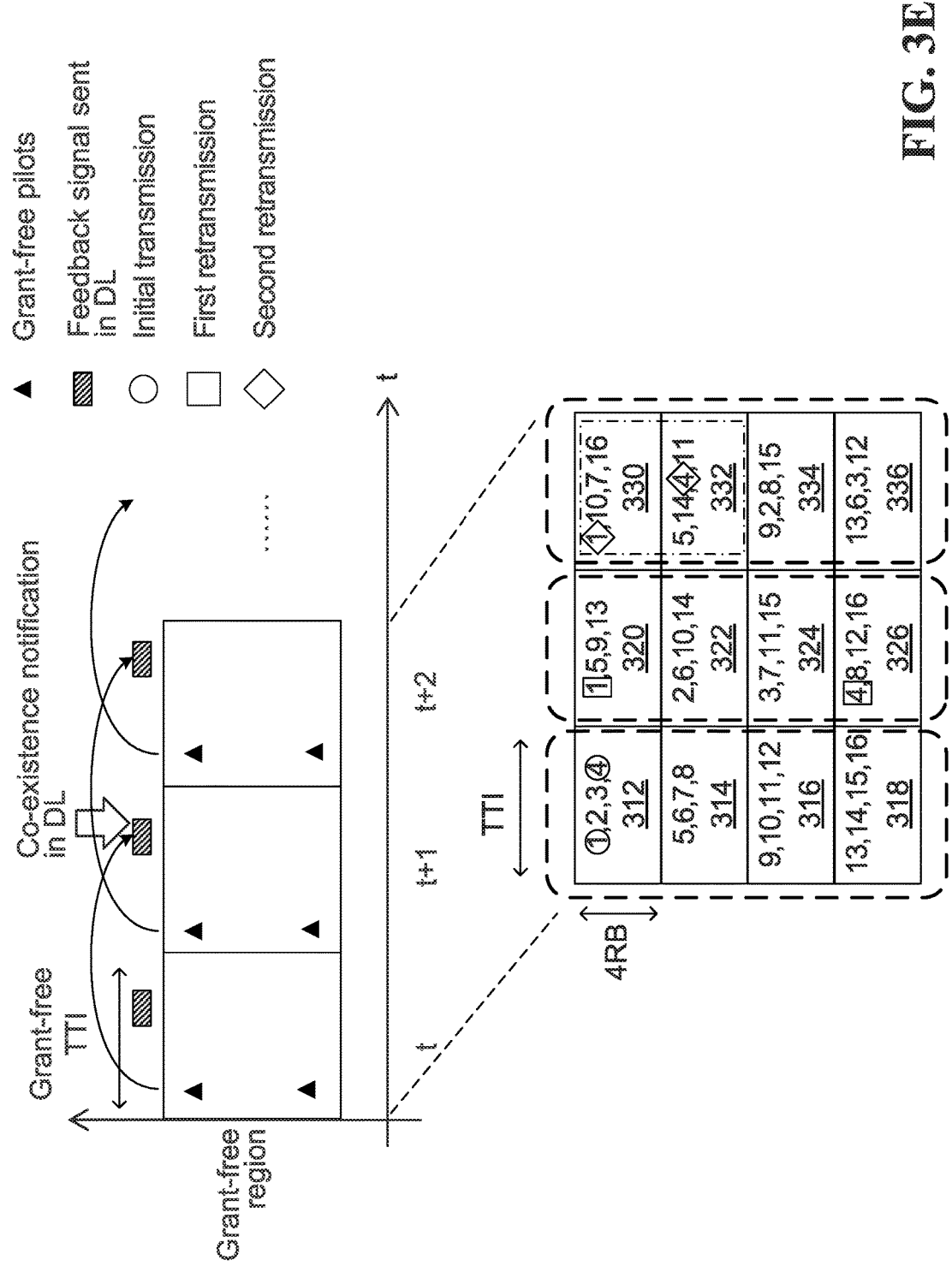
FIG. 3E is an example of UE mapping to resources defined for initial transmissions and retransmissions where there is no restriction on when a grant-free UE can make an initial transmission.

Referring now to FIG. 3E, shown is another example of mapping of UEs to resource areas. The mapping of UEs to three resource areas is the same as the mapping of UEs to resource areas 300,302,304 described with reference to FIG. 3D, and as such the mapping will not be described again in detail. However, for this embodiment, there is no restriction on when a first grant-free transmission is made as opposed to a first or second retransmission. Thus UE 1, for example, can make an initial transmission in any of regions 312,320, 330. A specific example is depicted in which initial transmissions for UEs 1 and 4 are represented by circled numbers, first retransmissions for UEs 1 and 4 are represented by numbers with squares around them, and second retransmissions for UEs 1 and 4 are represented by numbers with diamonds around them. With this embodiment, the base station detects new transmissions from UEs 1 and 4 in region 312 (for example using the pilot sequence based approach described below), and instructs grant-based UEs to puncture the regions 330,332 containing the second retransmissions for UEs 1 and 4. More generally, a distinction can be made between detected activity in respect of which there are enough retransmissions remaining for feedback to be useful, and detected activity in respect of which there are not enough retransmissions remaining for feedback to be useful. This can be done using the pilot sequence based approach, for example. This approach can also be applied in embodiments in which resource areas are defined for initial retransmissions, and retransmissions generally (for example the embodiment of FIG. 5 described below).

Figure 4A:
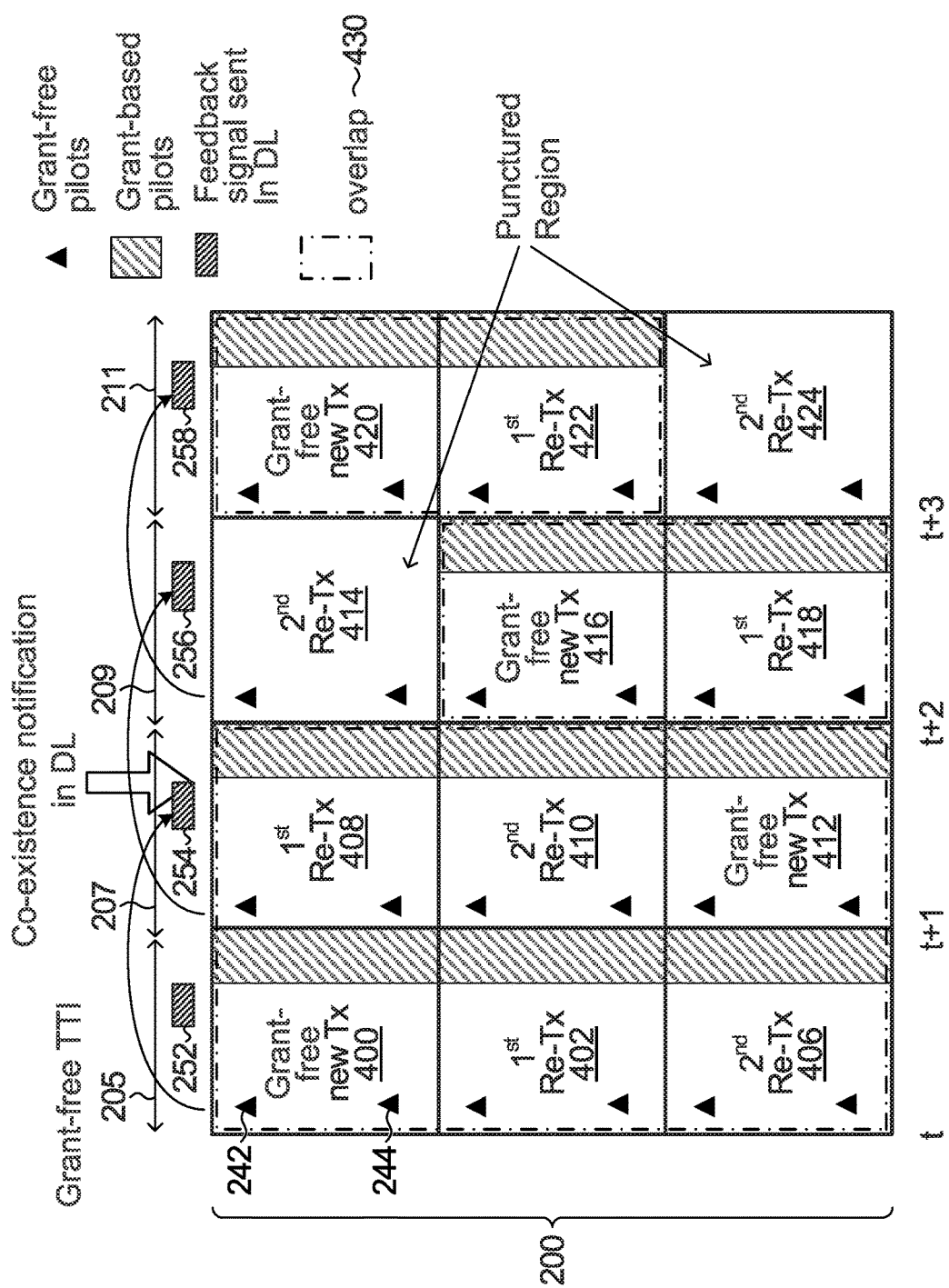
FIG. 4A is a time-frequency resource allocation diagram of a grant-free partition in which dedicated resources are defined for initial transmissions and for specific retransmissions.

In some embodiments, rather than requiring initial grant-free transmissions to be aligned, a logical division of a bandwidth available for grant-free transmission is made between portions available for new transmissions, and those available for retransmissions. A first example is depicted in FIG. 4A, which shows a specific logical division within the overlap partition 200. Elements that are in common with FIGS. 3A-3C are commonly numbered. This logical division may be semi-statically configured.

During the first grant-free TTI 205 in FIG. 4A, the partition 200 is divided into a resource area 400 for new transmissions, a resource area 402 for first retransmissions, and a resource area 406 for second retransmissions. During the second grant-free TTI 207, the partition 200 is divided into a resource area 408 for initial transmissions, a resource area 410 for second retransmissions, and a resource area 412 for new retransmissions. During the third grant-free TTI 209, the partition 200 is divided into a resource area 414 for second transmissions, a resource area 416 for new transmissions, and a resource area 418 for first retransmissions. During the fourth grant-free TTI 211, the partition 200 is divided into a resource area 420 for new transmissions, a resource area 422 for first retransmissions, and a resource area 424 for second retransmissions. With this approach, a grant-free UE can make an initial transmission in any of the four grant-free TTIs. Each resource area for new transmissions has a corresponding area for first retransmissions and a corresponding area for second retransmissions. For example, resource area 400 for first retransmissions has a corresponding area 408 for first retransmission and a corresponding area 414 for second retransmissions.

After an initial transmission is made in a resource area reserved for first transmissions, retransmissions are sent in the corresponding resource areas for retransmissions. In the example of FIG. 4A, each grant-free UE makes two retransmissions, but a similar approach can be used for another number of retransmissions. For example, a grant-free UE that makes an initial transmission using resource area 400 makes its first and second retransmissions using resource areas 408 and 414.

With this embodiment, the pilot symbols of the first grant-free transmissions are used by the base station for activity detection and optionally to assess channel quality, for the grant-free transmission. If activity is detected, or if activity is detected and channel quality is poor in respect of a new transmission made in one of the resource areas reserved for new transmissions (as defined by some threshold or criterion) then the downlink feedback channel is used to indicate that the corresponding resource area reserved for second retransmissions should be cleared of grant-based traffic. For example, if a new transmission occurs in resource area 400 for which channel quality is determined to be poor, feedback is sent using feedback opportunity 254 which indicates resource area 414 should be clear of grant-based traffic. In the illustrated example, feedback is also used to indicate that resource area 424 should be clear of grant-based traffic. In some embodiments, the first retransmission area is also or alternatively cleared of grant-based traffic if feedback can be generated and received/processed quickly enough This embodiment includes the optional feature of only generating the downlink feedback where the channel quality is poor, for example when the SINR is below a threshold. This feature can be added to any of the embodiments described herein relating to controlling the transmissions by grant-based UEs.

Figure 4B:
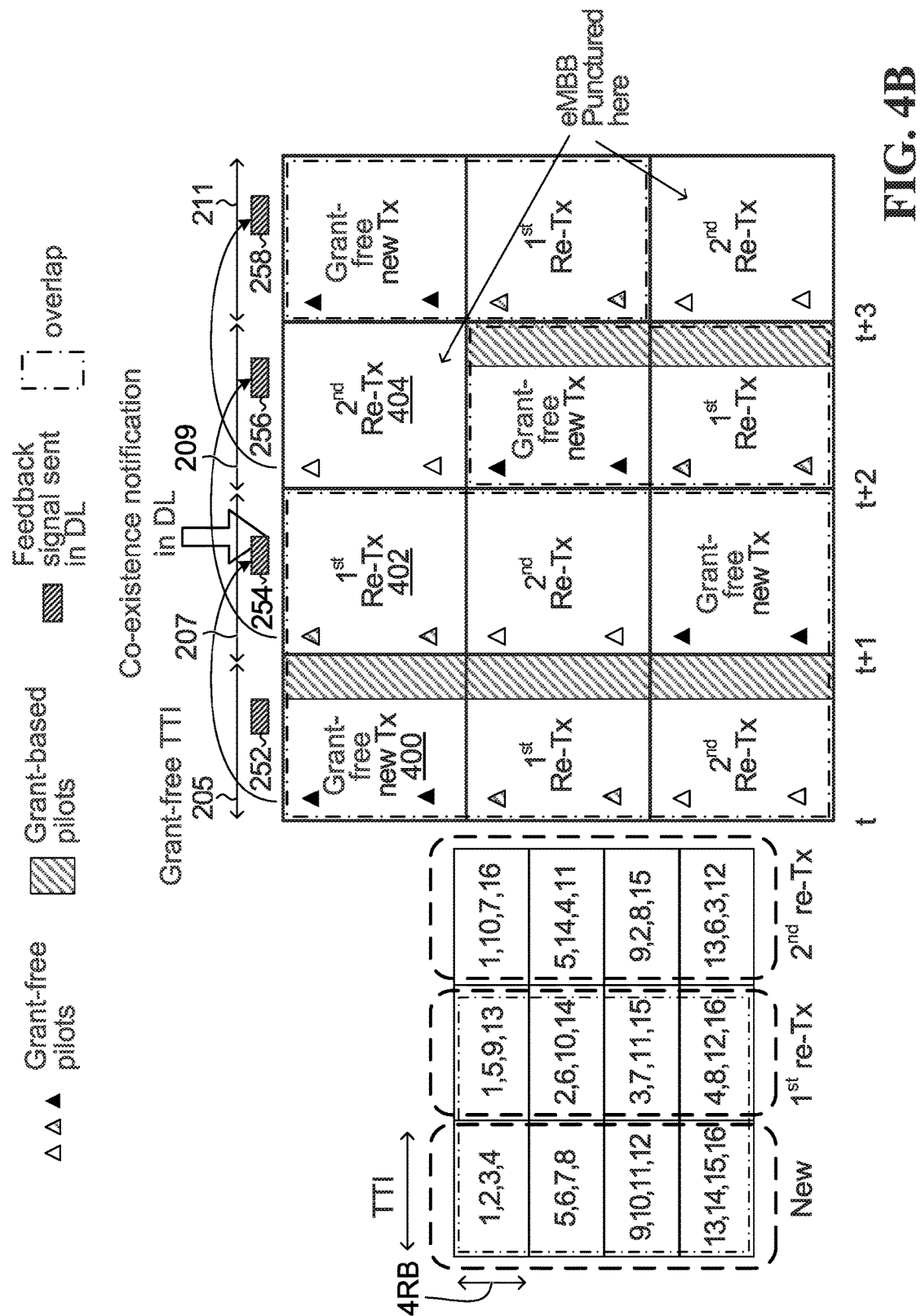
FIG. 4B is an example of UE mapping to resources defined for initial transmissions and retransmissions.

FIG. 4B shows an example of a mapping of UEs to the resource areas 400,402,404 of FIG. 4A. Such a mapping can be defined for any set of resource areas. The mapping can be different for different resource areas, and/or for different TTIs. In some embodiments, new transmissions and retransmissions are mapped differently to avoid repeated collisions. The mapping is the same as the mapping of UEs to resource areas 300,302,304 described with reference to FIG. 3D, so it will not be described again in detail.

In some embodiments, all grant-free UEs are configured to make the same number of retransmissions. Alternatively, differing numbers of retransmissions can be configured for different UEs. For example, some UEs may be configured with one retransmission, and other UEs may be configured with two retransmissions. The frequency of activity by UEs of different categories of UEs may differ significantly. For example, there may be more activity among UEs that transmit one retransmission compared to UEs that transmit two retransmissions. This could have the effect of some retransmission regions being underutilized. In some embodiments, resource areas are not dedicated specifically to be a certain retransmission (e.g. first or second), but rather some resource areas are dedicated to new transmissions, and other resources are dedicated to retransmissions of any type. Having such common retransmission resource areas may yield improved resource utilization. In some embodiments, based on pilot sequences, using for example an approach detailed below, the base station can determine which category of UE a given UE belongs to, for example a category with one retransmission as opposed to a category with two retransmissions. This information can be used by the base station to cause the appropriate region to be punctured by grant-based UEs.

Figure 5:
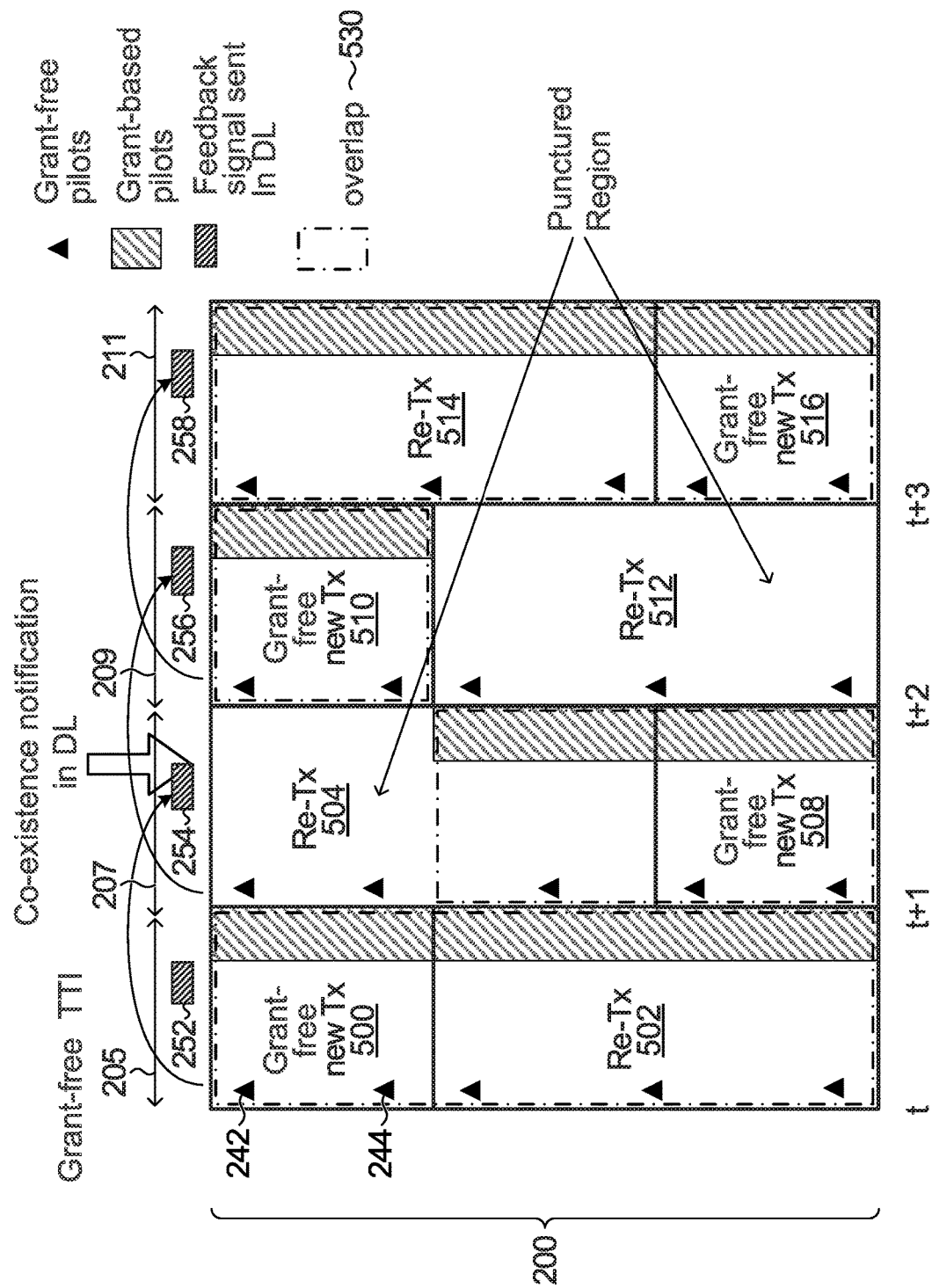
FIG. 5 is a time-frequency resource allocation diagram of a grant-free partition in which dedicated resources are defined for initial transmissions and retransmissions generally according to another embodiment.

An example of this approach is depicted in FIG. 5. During the first grant-free TTI 205, the partition 200 is divided into a resource area 500 for new transmissions, and a resource area 502 for retransmissions generally. The resource area 502 for retransmissions and the other such resource areas may be utilized for a grant-free UE to transmit a first retransmission or a second retransmission (more generally still any retransmission). During the second grant-free TTI 207, the partition 200 is divided into a resource area that includes areas 504 for retransmissions, and a resource area 508 for new transmissions. During the third grant-free TTI 209, the partition 200 is divided into a resource area 510 for new transmissions, and a resource area 512 for retransmissions. During the fourth grant-free TTI 211, the partition 200 is divided into a resource area 514 for retransmissions, a resource area 516 for new transmissions. With this approach, a UE can make an initial transmission in any of the four grant-free TTIs. After an initial transmission is made, retransmissions are sent in the resource areas reserved for retransmissions in subsequent grant-free TTIs. In the illustrated example, feedback is used to indicate that a part of resource area 504 and resource area 512 should be clear of grant-based traffic. In this example, a determination has been made that a retransmission will occur in a specific part of resource area 504, and only that specific part of resource area 504 is punctured. A mapping such as described by way of example with reference to FIG. 4B can be defined for embodiments that take the approach of FIG. 5.

As noted above, in some embodiments, the grant-free pilot symbols are used to distinguish between a initial transmission and a specific retransmission and/or to distinguish between different categories of UEs in terms of number of retransmissions expected. For a given UE, a first grant-free pilot symbol (or a pilot symbol from a first pool of pilot symbols) is used with an initial transmission, and a second grant-free pilot symbol (or a pilot symbol from a second pool of pilot symbols) is used with a retransmission or a specific retransmission. See, for example, commonly assigned U.S. application Ser. No. 15/088,607 filed Apr. 1, 2016, entitled "System and Method for Pilot Assisted Grant-free Uplink Transmission Identification", hereby incorporated by reference in its entirety. In some embodiments, this information is used to more precisely determine the resource used for the grant-free transmission such that only that precise resource need be punctured from the grant-based perspective.

Grant-Free Self-Contained TDD Frame Structure

Figure 6A:
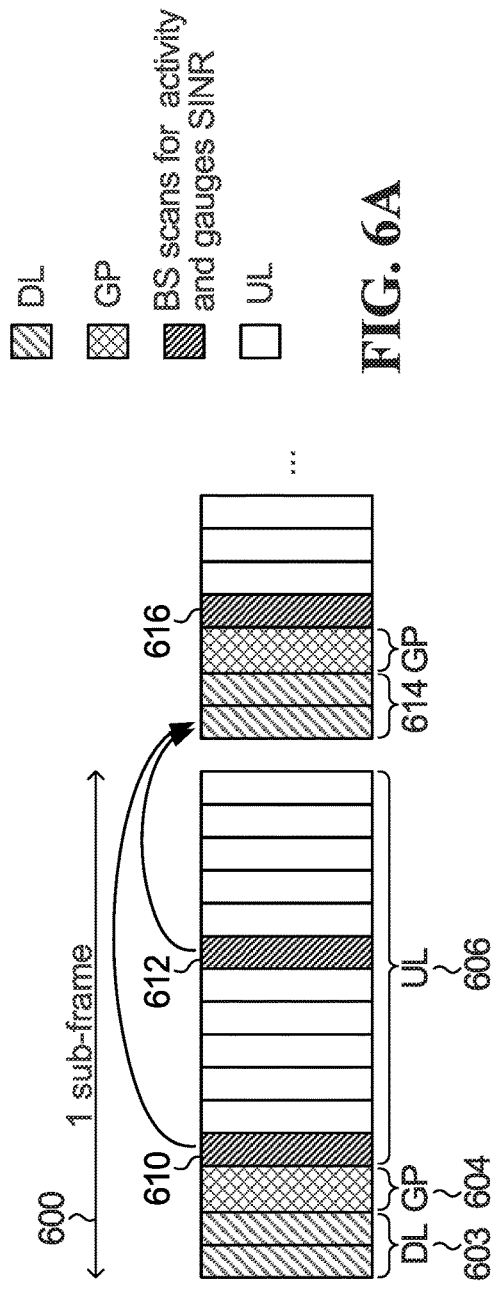
FIGS. 6A and 6B are examples of a grant-free time division duplex (TDD) frame structures.

In another embodiment, an activity based feedback mechanism is employed in respect of transmissions by grant-free UEs that employ a self-contained time division duplex (TDD) frame structure. An example is depicted in FIG. 6A which shows a grant-free sub-frame 600 having a downlink segment 603, a guard period 604, and an uplink segment 606. Such a sub-frame structure might, for example, be based on a 60 kHz sub-carrier spacing with 0.1 to 0.2 ms duration. If there are K symbols in the uplink segment, a base station can detect activity and estimate SINR thresholds for a subset N<<K symbols. N could be as low as N=1. In the illustrated example, the base station detects activity during two symbols where pilot symbols are mapped (the first 610 and seventh 612). The base station can then send feedback in the downlink segment 614 of the next sub-frame 616.

Figure 6B:
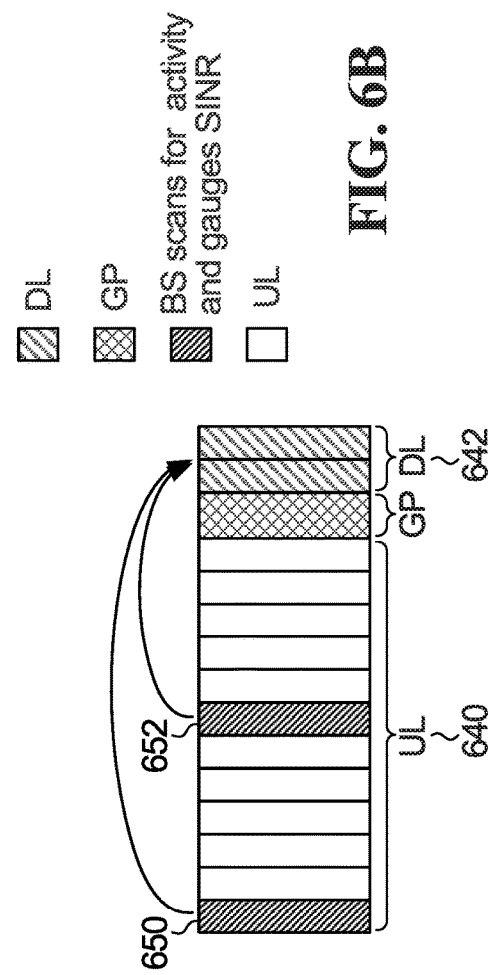

In another embodiment, the uplink segment precedes the downlink segment, and the feedback may be sent in the downlink segment in the same sub-frame. An example is depicted in FIG. 6B, in which measurements take place during uplink segment 640 on symbols 650, 652, and feedback is sent during downlink segment 642 of the same sub-frame.

In some embodiments, the feedback described is received by the grant-free UE that made the transmission, and can be used by the grant-free UE to reduce its retransmission by sending fewer than its default number of retransmissions. For example, if the base station detects the grant-free UE, and detects an SINR that is greater than a threshold and/or low activity/collision among grant-free UEs, the base station sends the feedback, and the grant-free UE may be configured to not retransmit, or to make a reduced number of retransmissions. The feedback functions as a pseudo-acknowledgement. It is not a full acknowledgement because it is not based on successfully decoding of received data, but rather is based on a channel quality measurement. This threshold based approach can be applied to any of the embodiments described herein to reduce retransmission by grant-free UEs.

It may be possible that some grant-free UEs experience a very good channel, and a very low error rate, e.g. $<1\times10^{-6}$ is predicted based on measurement. In such a case, the base station can use the feedback to provide the pseudo acknowledgement to the UEs indicating that they do not need to retransmit. Alternatively, or in addition, the base station can use the feedback to provide the pseudo acknowledgement to the UEs indicating they can stop retransmitting.

Figure 7:
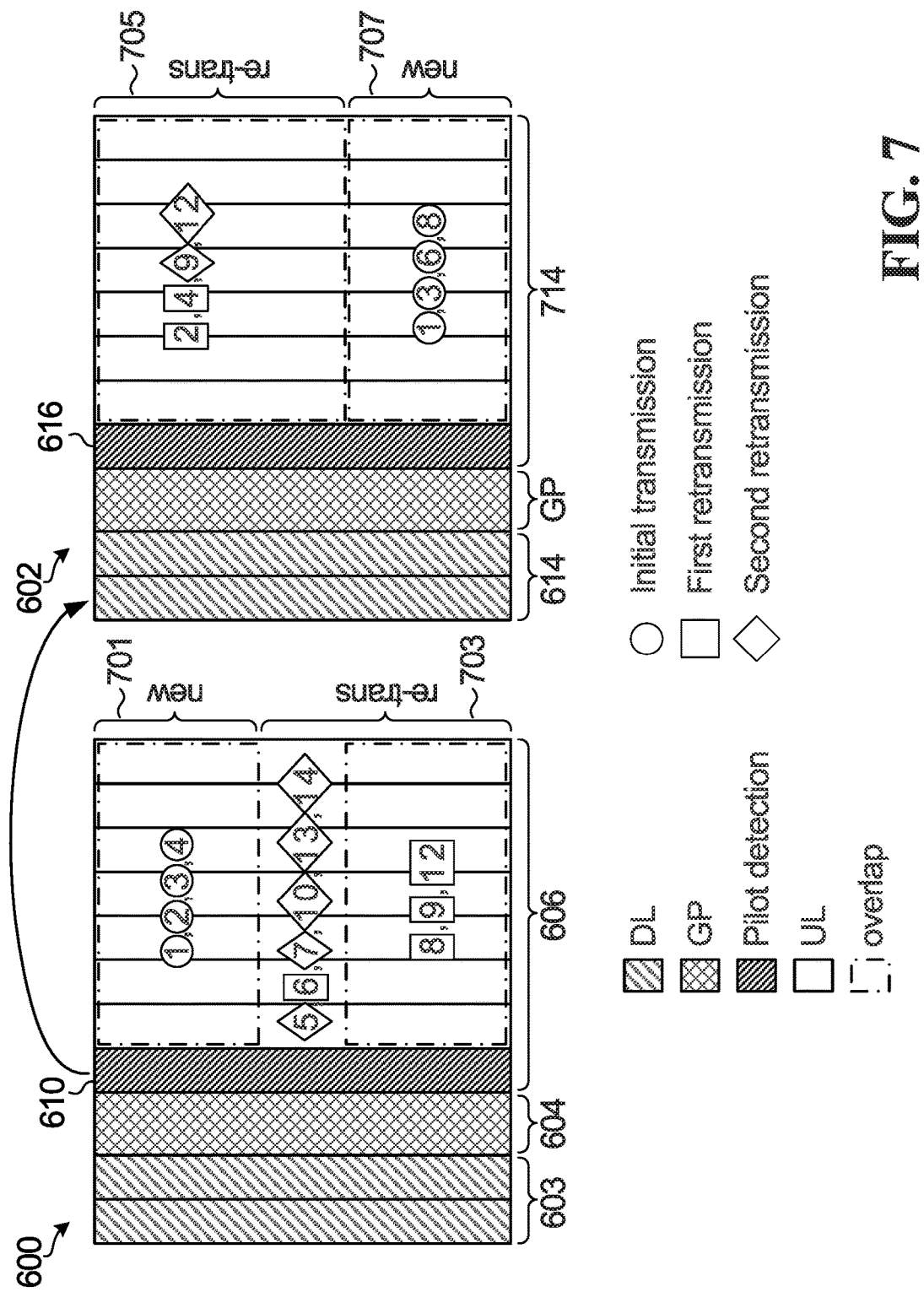
FIG. 7 is an example of a grant-free TDD frame structure, showing the adjustment of retransmissions based on feedback.

Another example is depicted in FIG. 7, which builds upon the example of FIG. 6, and employs common reference numerals. Example transmissions of UEs numbered 1 to 12 are depicted. Initial transmissions are represented by circled numbers, first retransmissions are represented by numbers with squares around them, and second retransmissions are represented by numbers with diamonds around them. With the example of FIG. 7, for frame 600 there is a dedicated sub-band 701 for initial transmissions, and a dedicated sub-band 703 for retransmissions. In frame 602 there are dedicated sub-bands 705,707 for retransmissions and new transmissions respectively. It is noted that the resource area definitions and mappings described previously for example with reference to FIGS. 3A-3E, 4A, 4B, and 5 and generalizations thereof, and the use of feedback to adjust grant-based UE transmission can similarly be applied in a TDD context.

In the illustrated example, the base station gauges channel quality for the 12 UEs during the pilot period 610, and sends feedback during the following downlink period 614 For this example, the base station has provided feedback to some UEs instructing them to retransmit fewer than their preconfigured number of retransmissions. In the illustrated example, during the first sub-frame 600, UEs 1, 2, 3 and 4 make initial transmissions. Feedback is sent during downlink portion 614 of the second sub-frame to UEs 1 and 3 indicating not to retransmit. As such, UEs 1 and 3 can use the next frame 602 for initial transmissions of additional data if desired. During the first sub-frame 600, UEs 6, 8, 9 and 12 are making first retransmissions, and UEs 5, 7, 10, 13, 14 are making second retransmissions. Feedback is sent during downlink portion 614 of the second sub-frame 602 indicating that UEs 6 and 8 are to stop retransmitting. The result is that of the UEs 6, 8, 9 and 12 that made a first retransmission, only UEs 9 and 12 make second retransmissions in the second sub-frame 602. The next frame 602 can be used for initial transmissions for UEs 6 and 8 if they have more data to send.

It is noted that while this approach of reducing/eliminating retransmissions is described in the context of the TDD examples of FIGS. 6A and 6B, and 7, the same approach can be used in the other embodiments described herein, in addition to, or instead of, using the feedback to control grant-free transmission.

In some embodiments, for robustness, the downlink control information is transmitted using resources dedicated to the control channel and not used for other purposes. In some embodiments, grant-free and grant-based traffic may share the downlink control resources in a TDM/FDM fashion.

Feedback Message

As detailed above, the grant-free partition may consist of several resource areas where UEs are mapped. The feedback message may be a function of the number of resource areas, and whether the feedback concerns a new transmission or a re-transmission. For example, in one embodiment, the feedback message has two fields. The first field denotes whether the feedback concerns new transmissions or retransmissions, and the second field is a bitmap of the resource areas. More detailed feedback is also possible, depending on UE capability.

In many of the embodiments described, the feedback is used to indicate when grant-based UEs are to stop transmitting in an area of overlap. In another embodiment, grant-based traffic can be scheduled based on the feedback to avoid or mitigate collisions with grant-free retransmissions.

Figure 8A:
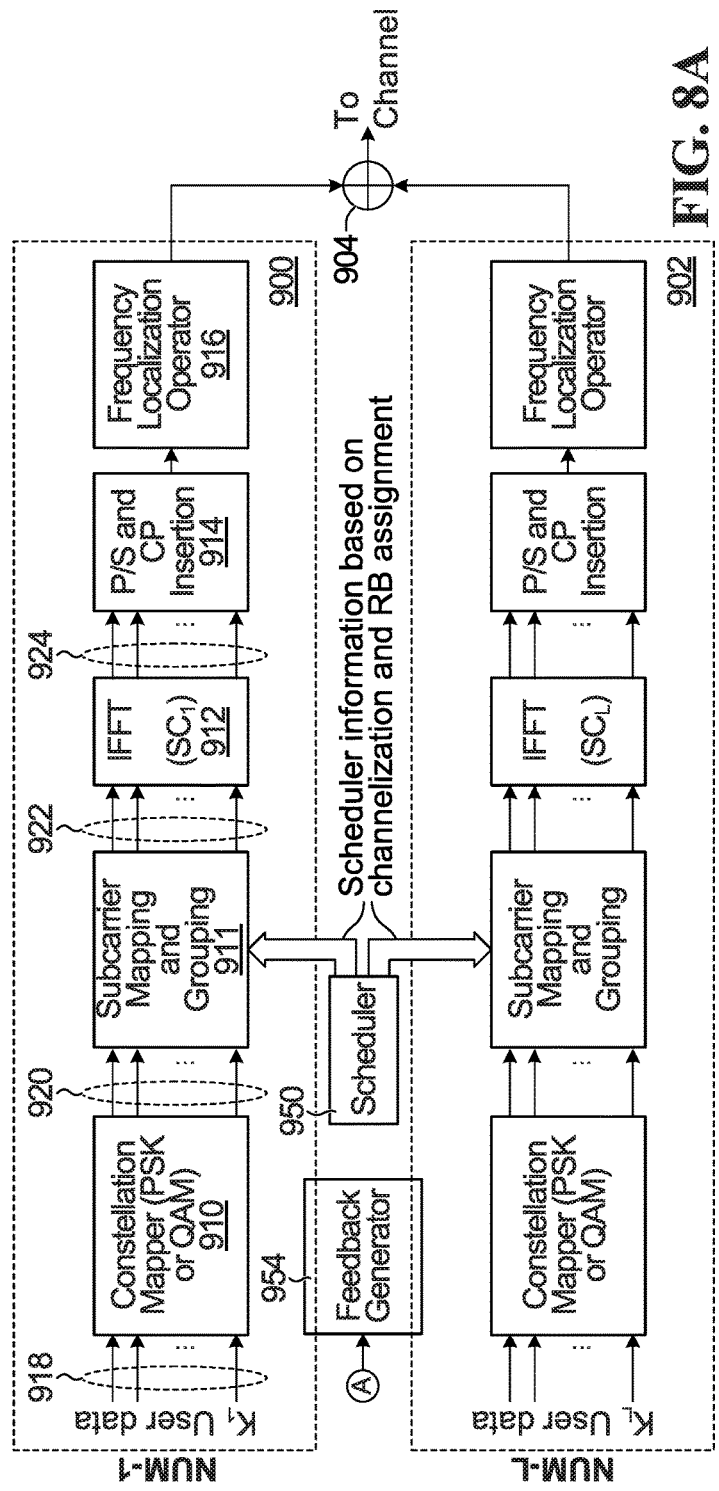
FIGS. 8A and 8B are block diagrams of a base station transmitter and receiver, respectively.

Referring now to FIG. 8A, shown is a simplified diagram of part a base station that can operate using multiple numerologies. In this example, there are L supported numerologies, where L>=2, each numerology operating over a respective sub-band with a respective sub-carrier spacing. However, the approaches described herein can also be applied when there is only a single numerology.

Figure 8B:
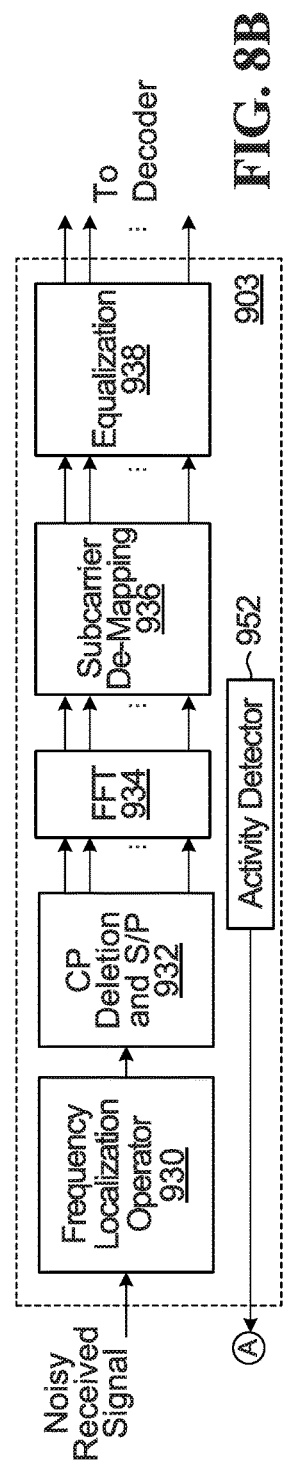

For each numerology, there is a respective transmit chain 900, 902. FIG. 8A shows simplified functionality for the first and Lth numerology; the functionality for other numerologies would be similar. Also shown in FIG. 8B is simplified functionality for a receive chain 903 for a receiver operating using the first numerology.

The transmit chain 900 for the first numerology includes a constellation mapper 910, subcarrier mapping and grouping block 911, IFFT 912 with subcarrier spacing $SC_1$, pilot symbol and cyclic prefix insertion 914, and frequency localization operator 916 (for example filtering, sub-band filtering, windowing, sub-band windowing). Also shown is a scheduler 900 that performs scheduling. It is noted that depending on the frequency localization operator implementation, different guard zones may be needed at the two edges of the spectrum and/or between sub-bands with different numerologies (i.e. different sub-carrier spacings). In some embodiments, the guard zones are determined taking into account frequency localization capabilities of both the transmitter and receiver. Also shown is a feedback generator 954.

In operation, constellation mapper 910 receives UE data (more generally, UE content containing data and/or signalling) for $K_1$ UEs, where $K_1 >= 1$. The constellation mapper 910 maps the UE data for each of the $K_1$ UEs to a respective stream of constellation symbols and outputs this at 920. The number of UE bits per symbol depends on the particular constellation employed by the constellation mapper 910. In the example of quadrature amplitude modulation (QAM), 2 bits from for each UE are mapped to a respective QAM symbol.

For each OFDM symbol period, the subcarrier mapping and grouping block 911 groups and maps the constellation symbols produced by the constellation mapper 910 to up to P inputs of the IFFT 912 at 922. The grouping and mapping is performed based on scheduler information, which in turn is based on channelization and resource block assignment, in accordance with a defined resource block definition and allocation for the content of the $K_1$ UEs being processed in transmit chain 900. P is the size of the IFFT 912. Not all of the P inputs are necessarily used for each OFDM symbol period. The IFFT 912 receives up to P symbols, and outputs P time domain samples at 924. Following this, in some implementations, time domain pilot symbols are inserted and a cyclic prefix is added in block 914. The frequency localization operator 916 may, for example, apply a filter $f_1(n)$ which limits the spectrum at the output of the transmit chain 900 to prevent interference with the outputs of other transmit chains such as transmit chain 902. The frequency localization operator 916 also performs shifting of each sub-band to its assigned frequency location.

The functionality of the other transmit chains, such as transmit chain 902 is similar. The outputs of all of the transmit chains are combined in a combiner 904 before transmission on the channel.

The activity detector 952 performs activity detection and/or SINR measurement to detect and measure the signal quality of uplink transmissions from grant-free UEs. The feedback generator 954 generates feedback based on an output of activity detector 952 (described below as part of the transmit chain) in accordance with one of the methods described herein. This can be transmitted by puncturing user data at the input to the constellation mappers, or on a dedicated downlink feedback channel.

FIG. 8B shows a simplified block diagram of a receive chain for of a base station receiving using a first numerology depicted at 903. This functionality would be replicated where multiple numerologies are supported. The receive chain 903 includes frequency localization operator 930, cyclic prefix deletion and pilot symbol processing 932, fast Fourier transform (FFT) 934, subcarrier de-mapping 936 and equalizer 938. Each element in the receive chain performs corresponding reverse operations to those performed in the transmit chain. Also shown is activity detector 952 that performs activity detection using any one of the methods described herein. The output of the activity detector 952 is passed to the feedback generator 954.

The transmit chain of a grant-free UE and a grant-based UE may be similar to that of a base station although there would be no scheduler and no feedback generator 952. Also, for a grant-free UE typically a single numerology is supported; a grant-based UE may support one or multiple numerologies The receive chain of a grant-free UE and a grant-based UE may be similar to that of a base station although again for a grant-free UE typically a single numerology is supported; a grant-based UE may support one or multiple numerologies. In place of the activity detector 952, a grant-free UE may have a feedback processor that processes received feedback and modifies retransmission behaviour using of the methods detailed previously. Alternatively, or in addition, a grant-based UE may have a feedback processor that processes received feedback and modifies its transmissions using one of the methods detailed previously.

Numerous modifications and variations of the present disclosure are possible in light of the above teachings. It is therefore to be understood that within the scope of the appended claims, the disclosure may be practiced otherwise than as specifically described herein.

The invention claimed is:

1. A method comprising:
   during a grant-free transmit time interval (TTI), a base station performing grant-free activity detection;
   the base station transmitting a notification to adjust grant-based transmission based on a result of the grant-free activity detection.

2. The method of claim 1 wherein the base station transmitting a notification to adjust grant-based transmission comprises transmitting the notification when activity is detected.

3. The method of claim 1 wherein the notification to adjust grant-free transmission indicates that a grant-based UE configured to make a scheduled transmission using resources that include an area of overlap with resources for grant-free UEs is not to transmit in the area of overlap.

4. The method of claim 1 wherein performing activity detection comprises detecting at least one transmission by at least one grant-free UE with an indication that the at least one transmission will be retransmitted.

5. The method of claim 1 further comprising:
   estimating an associated SINR of a detected activity;
   wherein the base station transmits the notification to adjust grant-based transmission when activity is detected and the associated SINR is less than a threshold.

6. The method of claim 5 wherein the notification to adjust grant-based transmission indicates that a grant-based UE configured to make a scheduled transmission using resources that include an area of overlap with resources for grant-free UEs is not to transmit in the area of overlap.

7. The method of claim 1 wherein transmitting a notification comprises transmitting an indication of whether or not to adjust grant-based transmission for each of resource area of a plurality of resource areas within a grant-free frequency partition.

8. The method of claim 1 wherein transmitting a notification comprises using a dedicated downlink feedback channel.

9. The method of claim 1 wherein transmitting a notification comprises puncturing downlink transmissions.

10. The method of claim 1 wherein:
    performing grant-free activity detection comprises determining whether a detected grant-free transmission is a grant-free transmission in respect of which at least one more retransmission is expected or is a retransmission in respect of which at least one further retransmission is expected; and
    the base station transmits the notification to adjust grant-based transmission based on a result of the grant-free activity detection when it is determined that the detected grant-free transmission is a grant-free transmission in respect of which at least one further retransmission is expected, or a retransmission in respect of which at least one further retransmission is expected.

11. The method of claim 1 wherein for the purpose of generating the notification, performing grant-free activity detection comprises performing grant-free activity detection in respect of an uplink resource for an in initial grant-free transmission in respect of which one further retransmission is expected, or in respect of a resource for a retransmission in respect of which at least one further retransmission is expected.

12. A method comprising:
   during a grant-free transmit time interval (TTI), a base station performing grant-free activity detection;
   estimating an associated signal-to-interference-plus-noise ratio (SINR) of a detected activity;
   the base station transmitting a notification to reduce grant-free retransmission based on a result of the grant-free activity detection when activity is detected and the associated SINR is greater than a threshold.

13. The method of claim 12 wherein transmitting a notification comprises using a dedicated downlink feedback channel.

14. The method of claim 12 wherein transmitting a notification comprises puncturing downlink transmissions.

15. The method of claim 12 further comprising:
   as part of performing grant-free activity detection, determining whether a detected grant-free transmission is an initial transmission or a retransmission;
   the base station transmitting the notification to reduce grant-free retransmission based on a result of the grant-free activity detection when it is determined that the detected grant-free transmission is an initial transmission or a retransmission in respect of which at least one further retransmission is expected.

16. The method of claim 12 wherein for the purpose of generating the notification, performing grant-free activity detection comprises performing grant-free activity detection in respect of uplink resources dedicated to initial grant-free transmissions, or in respect of uplink resources dedicated to retransmissions in respect of which at least one further retransmission is expected.

* * * * *